(12) United States Patent
Fuller et al.

(10) Patent No.: US 9,297,313 B2
(45) Date of Patent: Mar. 29, 2016

(54) CONTROL APPARATUS FOR ANGLING GUIDE VANES OF A TORQUE CONVERTER

(75) Inventors: Jason Dean Fuller, Simpsonville, SC (US); Justin Aaron Allen, Greenville, SC (US); Karl Dean Minto, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 1233 days.

(21) Appl. No.: 13/231,761

(22) Filed: Sep. 13, 2011

(65) Prior Publication Data

US 2013/0061601 A1    Mar. 14, 2013

(51) Int. Cl.
| | |
|---|---|
| *F02C 7/268* | (2006.01) |
| *F02C 7/275* | (2006.01) |
| *F02C 9/28* | (2006.01) |
| *F02C 7/262* | (2006.01) |
| *F02C 7/27* | (2006.01) |

(52) U.S. Cl.
CPC ............. *F02C 7/268* (2013.01); *F02C 7/262* (2013.01); *F02C 7/27* (2013.01); *F02C 7/275* (2013.01); *F02C 9/28* (2013.01)

(58) Field of Classification Search
CPC ............ F02C 7/26; F02C 7/262; F02C 7/264; F02C 7/266; F02C 7/268; F02C 7/27; F02C 7/272; F02C 7/275; F02C 7/277; F02C 9/28
USPC ........... 60/778, 788, 787, 718, 793, 786, 354, 60/355, 356, 357, 358, 359, 360, 332; 477/53.168, 53, 168; 192/3.29
See application file for complete search history.

(56) References Cited

U.S. PATENT DOCUMENTS

| | | | | |
|---|---|---|---|---|
| 3,263,522 | A | * | 8/1966 | General ........................... 477/66 |
| 3,300,970 | A | | 1/1967 | Lindeman |
| 3,793,905 | A | * | 2/1974 | Black et al. ..................... 74/661 |
| 3,795,104 | A | | 3/1974 | McLean |
| 3,797,975 | A | | 3/1974 | Keller |
| 3,808,809 | A | * | 5/1974 | Upton ............................. 60/347 |
| 3,886,729 | A | * | 6/1975 | Amann et al. ............... 60/39.24 |
| 3,901,030 | A | * | 8/1975 | Wonn .............................. 60/341 |
| 3,973,391 | A | | 8/1976 | Reed et al. |
| 4,012,908 | A | * | 3/1977 | Dundore ........................ 60/354 |
| 4,043,119 | A | * | 8/1977 | Faulkner ........................ 60/788 |
| 4,672,810 | A | | 6/1987 | Marlowe |
| 4,993,527 | A | * | 2/1991 | Benford et al. ................. 477/65 |
| 5,203,160 | A | * | 4/1993 | Ozono ............................ 60/778 |
| 5,224,337 | A | | 7/1993 | Morishita et al. |
| 5,343,970 | A | * | 9/1994 | Severinsky ................ 180/65.25 |
| 5,441,135 | A | | 8/1995 | Worner et al. |
| 6,178,733 | B1 | * | 1/2001 | Nelson ............................ 60/778 |
| 6,463,740 | B1 | * | 10/2002 | Schmidt et al. ................ 60/772 |

(Continued)

*Primary Examiner* — Phutthiwat Wongwian
*Assistant Examiner* — Michael B Mantyla
(74) *Attorney, Agent, or Firm* — Ernest G. Cusick; Frank A. Landgraff

(57) ABSTRACT

A control apparatus for angling guide vanes of a torque converter is provided and includes a modeling unit configured to receive current condition data, to determine a current input power supplied by a starting motor from the current condition data and to output a result of the determination as a control signal and a controller, which is coupled to the modeling unit and thereby receptive of the control signal. The controller is configured to execute a comparison of the current input power with a rating of the starting motor and to angle the guide vanes of the torque converter at an angle in accordance with a result of the comparison.

9 Claims, 3 Drawing Sheets

(56) References Cited

U.S. PATENT DOCUMENTS

| | | | |
|---|---|---|---|
| 6,838,778 B1* | 1/2005 | Kandil et al. | 290/31 |
| 7,096,657 B2 | 8/2006 | Mahoney et al. | |
| 7,818,965 B2* | 10/2010 | Endrasik, Jr. | 60/358 |
| 7,914,411 B2 | 3/2011 | Basteck | |
| 8,768,590 B2* | 7/2014 | Tsukamoto et al. | 701/68 |
| 2006/0022524 A1* | 2/2006 | Bryde et al. | 307/64 |
| 2006/0214508 A1* | 9/2006 | Binder | 307/10.7 |
| 2007/0060442 A1* | 3/2007 | Ransbarger et al. | 477/53 |
| 2010/0287948 A1* | 11/2010 | Draper et al. | 60/778 |
| 2011/0048119 A1* | 3/2011 | Hansen et al. | 73/118.01 |
| 2012/0101640 A1* | 4/2012 | Stapelfeldt | 700/287 |

* cited by examiner

CONTROL APPARATUS FOR ANGLING GUIDE VANES OF A TORQUE CONVERTER

BACKGROUND OF THE INVENTION

The subject matter disclosed herein relates to a control apparatus for angling guide vanes of a torque converter.

Torque converters are used for many applications such as starting turbo-machines of gas turbine engines or accelerating large synchronous motors to speed prior to connecting them to the electrical grid. In these applications, a large motor is coupled to one side of the torque converter with the other side being coupled to a drive shaft of the gas turbine engine or motor. The torque converter converts the torque provided by the starting motor into startup torque for the gas turbine engine or a large synchronous motor. Such startup operations may lead to component failures due to either electrical or mechanical overloading of the starting motor, torque converter, or couplings. Decreasing the acceleration of the turbine or synchronous motor may reduce the likelihood of component failure, however, such a course may also lead to decreased customer satisfaction due to increased startup times.

BRIEF DESCRIPTION OF THE INVENTION

According to one aspect of the invention, a control apparatus for angling guide vanes of a torque converter is provided and includes a modeling unit configured to receive current condition data, to determine a current input power supplied by a starting motor from the current condition data and to output a result of the determination as a control signal and a controller, which is coupled to the modeling unit and thereby receptive of the control signal. The controller is configured to execute a comparison of the current input power with a rating of the starting motor and to angle the guide vanes of the torque converter at an angle in accordance with a result of the comparison.

According to another aspect of the invention, a system is provided and includes a gas turbine engine to generate power from combustion, the gas turbine engine including a compressor to compress inlet gas for use in the combustion and/or a motor, a starting motor and torque converter pair to apply torque to an output shaft to which the compressor and/or the motor is coupled and a control apparatus to control an operation of the starting motor and torque converter pair in accordance with a condition of the output shaft.

According to yet another aspect of the invention, a system is provided and includes a torque converter to convert input torque into output torque and having guide vanes configured to be angled at various angles, a starting motor to transmit the input torque to the torque converter in accordance with an angle of the guide vanes via an input shaft to which the starting motor and the torque converter are coupled, a gas turbine engine to generate power from combustion, the gas turbine engine including a compressor to compress inlet gas for use in the combustion, an output shaft to which the torque converter and the compressor are coupled and by which the output torque is transmitted from the torque converter to the compressor and a control apparatus to control an angling of the guide vanes in accordance with a rotational speed of the output shaft.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
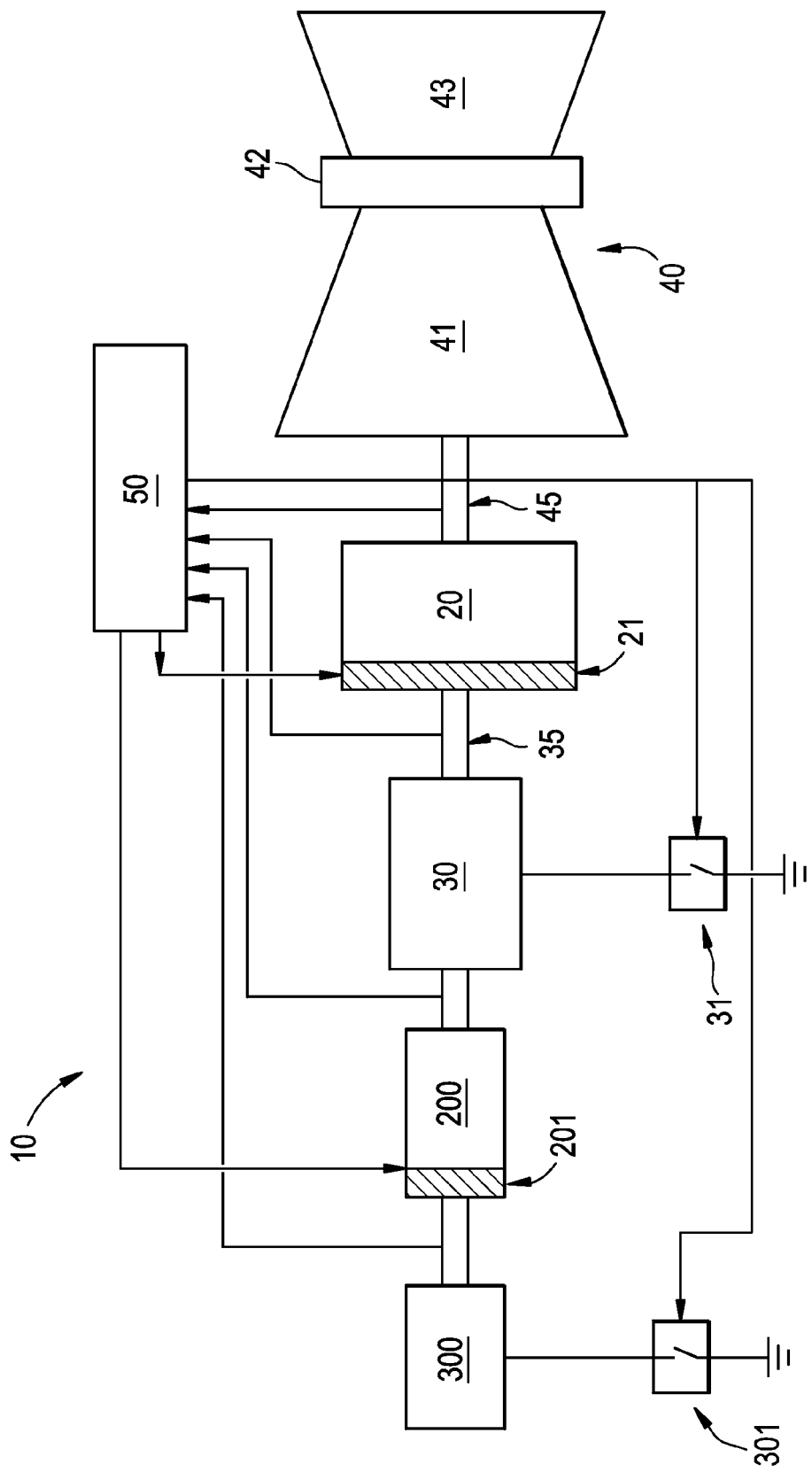
FIG. 1 is a schematic diagram of a system including a control apparatus for angling torque converter guide vanes.

With reference to FIG. 1, a system 10 is provided. The system includes a torque converter 20 and a starting motor 30. The torque converter 20 is configured to convert input torque into output torque and has guide vanes 21 that can be angled at various angles to promote such torque conversion. The guide vanes 21 themselves do not admit or prevent admission of oil but instead direct oil flow to create more or less torque in the torque converter 20. Where the guide vane 21 angle is large or open, the flow of fluid is permitted such that a relatively substantial fraction of the input torque is convertible to output torque. By contrast, where the guide vane 21 angle is small or closed, the flow of fluid is prevented such that a relatively small fraction of the input torque is convertible to output torque.

The starting motor 30 transmits the input torque to the torque converter 20 via an input shaft 35 to which the starting motor 30 and the torque converter 20 are each coupled. The input torque transmission is achieved in accordance with the angle of the guide vanes 21 whereby the torque converter 20 draws power from the starting motor 30 in accordance with the guide vane 21 angle. The starting motor 30 is thereby prevented from transmitting a relatively large input torque to the torque converter 20 if the guide vanes 21 are closed but is permitted to transmit the relatively large input torque if the guide vanes 21 are open. Normally, the angle of the guide vanes 21 is set to maintain a desired acceleration profile. If this profile is too aggressive, however, the starting motor 30 could trip offline or be damaged. In addition, the torque converter 20 could be damaged due to excessive torque or a mechanical coupling on output shaft 45, which is discussed below, could fail.

The system 10 may further include a gas turbine engine 40 and the output shaft 45. The gas turbine engine 40 is configured to generate power and/or electricity from combustion of combustible materials and includes at least a compressor 41 to compress inlet gas for use in the combustion, a combustor 42 in which the combustion occurs and a turbine section 43 where the products of the combustion are employed in the generation of the power and/or electricity. The torque converter 20 and the compressor 41 are each coupled to the output shaft 45 such that the output torque is transmitted from the torque converter 20 to the compressor 41 via the output shaft 45. As an alternative or additional embodiment, the torque converter 200 and the starting motor 300 (both of which are described below) could be used to accelerate the starting motor 30 or the torque converter 20 and the starting motor 30 could be used to accelerate a relatively large synchronous motor to speed with or without a gas turbine engine. In any of these cases, the starting motor 30 or the relatively large synchronous motor may not otherwise be capable of being directly started across the line due to, for example, high inrush electrical current.

As shown in FIG. 1, the torque converter 20 and the starting motor 30 form a pair that is arranged in series upstream from the gas turbine engine 40. In accordance with further embodiments, an additional torque converter 200 and an additional starting motor 300 may form an additional pair that is arranged in series with the torque converter 20 and the starting motor 30. In these embodiments, the starting motor 300 of the additional pair may have a substantially lower rating than the starting motor 30. Thus, the additional pair may be operated at low to medium loads during, for example, startup of the gas turbine engine 40 while the torque converter 20 and the starting motor 30 may be operated at medium to high loads. In this way, the starting motor 30 and the additional starting motor 300 can be operated at respectively efficient levels for each.

When additional starting motor 300 runs for, for example, low speed operation of the gas turbine engine 40, the starting motor 30 may not be electrically connected and may be disposed in a coasting condition. In such cases, the torque converter 20 may be filled with fluid in order to pass torque.

The system 10 also includes a control apparatus 50. The control apparatus 50 controls operations of the torque converter 20 and the starting motor 30 pair as well as operations of the additional torque converter 200 and starting motor 300 pair in accordance with a condition of the output shaft 45. For example, the control apparatus 50 may be configured to sense a rotational speed of the output shaft 45 and to place the starting motor 30 and torque converter 20 in an operational condition at a high output shaft 45 speed or to place the additional starting motor 300 and torque converter 200 in an operational condition at a low output shaft 45 speed. The sensing of the speed of the output shaft 45 may be achieved by various method and devices such as, but not limited to, attaching to the output shaft 45 a rotational speed sensor that is coupled to the control apparatus 50.

In accordance with an embodiment, the control apparatus 50 may control operations of the starting motor 30 and the additional starting motor 30 by way of the breakers 31 and 301, respectively, which provide electrical power to the starting motor 30 and the additional starting motor 300 from the electrical grid.

Figure 2:
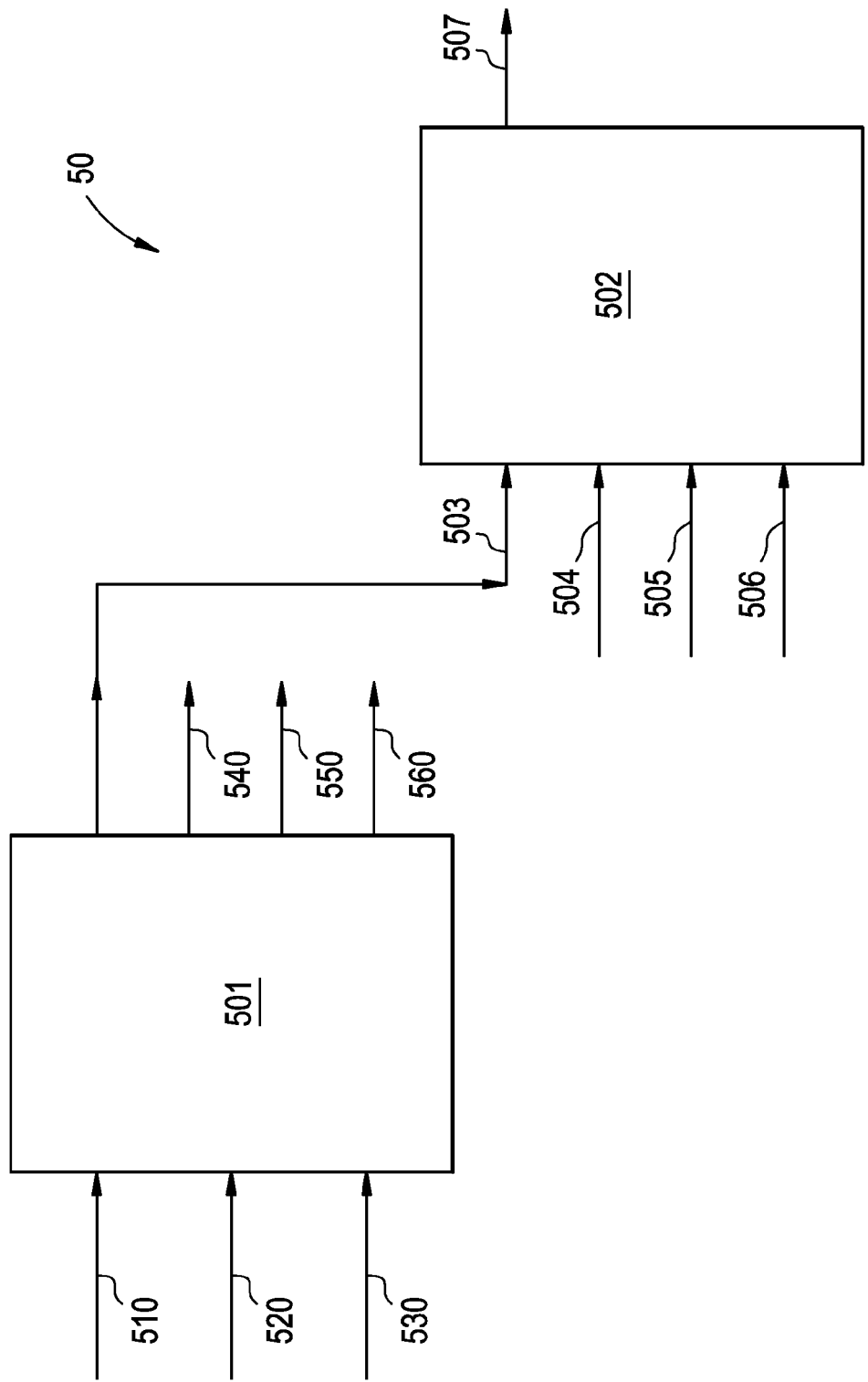
FIG. 2 is a schematic diagram of the control apparatus of FIG. 1.

In accordance with further embodiments, the control apparatus 50 may control an angling of the guide vanes 21 of the torque converter 20 (or the guide vanes 201 of the additional torque converter 200) in accordance with a rotational speed of the output shaft 45. To this end, with reference to FIG. 2, the control apparatus 50 includes a modeling unit 501 running in real-time simultaneously with the control apparatus 50 and a controller 502. The modeling unit 501 may be embodied as a non-transitory computer readable medium having executable instructions stored thereon for causing the controller 502 to perform the methods described herein and may be configured to receive current condition data, to determine a current input power supplied by the starting motor 30 from the current condition data and to output a result of the determination as a control signal 503.

The controller 502 may include a proportional-integral (PI) controller or a similar type of controller and is coupled to the modeling unit 501. The controller 502 is thereby receptive of the control signal 503 and may be additionally receptive of rating data 504 of the starting motor 30, proportional gain data 505 and integral gain data 506. The controller 502 is thus configured to execute a comparison of the current input power with the rating of the starting motor 30 and to issue a servo control signal 507 to angle the guide vanes 21 at an angle in accordance with a result of the comparison, the proportional gain data 505 and the integral gain data 506. In this way, the torque converter 20 is prevented from drawing excessive power from the starting motor 30 while matching or increasing as much as possible the desired acceleration profile of the gas turbine engine 40.

The current condition data to be received by the modeling unit 501 may include at least one or more of a current rotational speed 510 of the input shaft 35, a current guide vane angle 520 of the guide vanes 21 and a current rotational speed 530 of the output shaft 45. Using this current condition data, the modeling unit 501 generates and outputs the control signal 503 and may additionally determine a current output torque 540 (this is also used as a control signal for FIG. 3) supplied by the torque converter 20, a current output power 550 supplied by the torque converter 20 and a current efficiency 560 of the torque converter 20. These additional determinations can be employed by the modeling unit to at least modulate the generation and output of the control signal 503 over time as it is possible than an efficiency of the torque converter 20 will tend to decrease.

Figure 3:
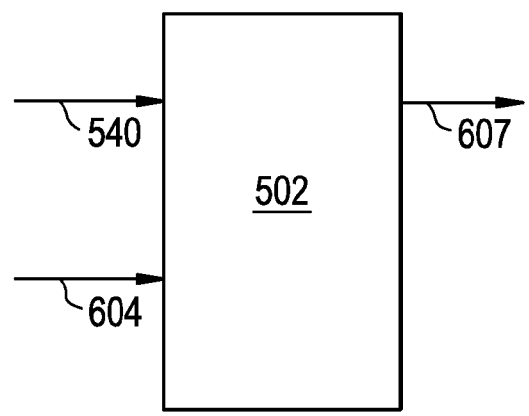
FIG. 3 is a schematic diagram of the control apparatus of FIG. 1 in accordance with further embodiments.

With reference to FIG. 3, and in accordance with an alternate embodiment, the controller 502 may be receptive of the current output torque 540 from the modeling unit 501 along with a signal 604. The signal 604 may be reflective of a torque limit of, for example, couplings of the torque converter 20. In this case, the controller 502 may be further configured to execute a comparison between current output torque and system torque limits to generate a second control signal 607. The second control signal 607 may then be reflective of a maximum allowable torque of the system as a whole and at least the torque converter 20.

Figure 4:
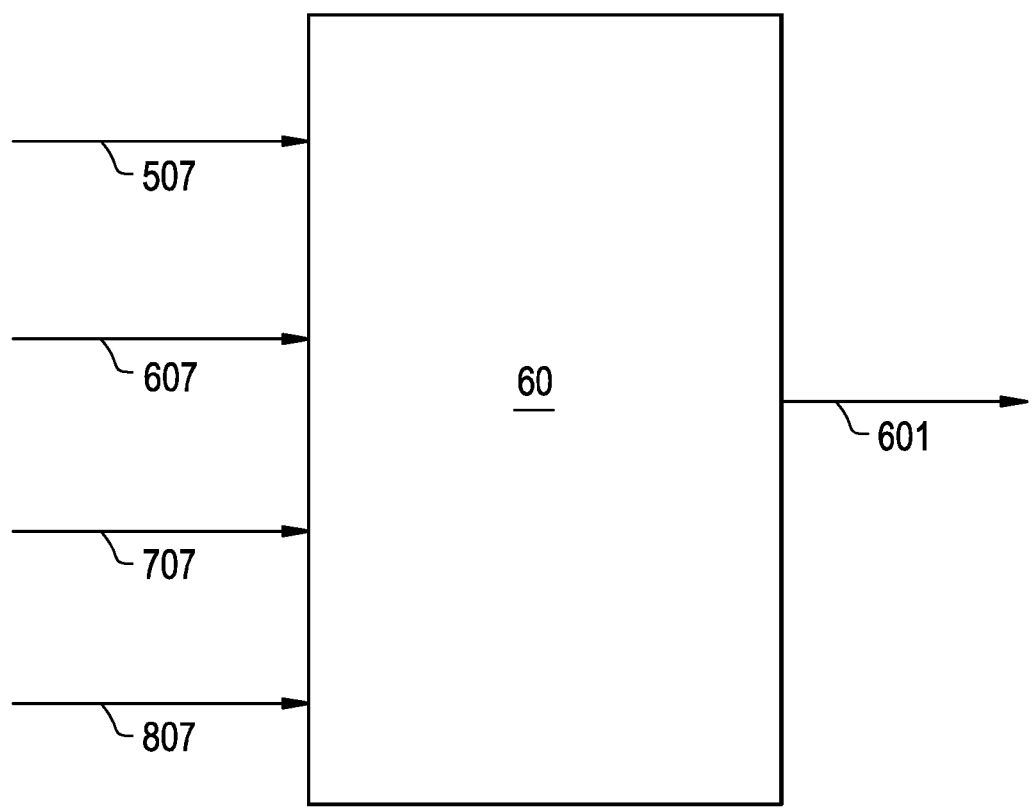
FIG. 4 is a schematic diagram of further embodiments of the control apparatus.

With reference to FIG. 4, the control apparatus 50 may further include a control loop unit 60. The control loop unit 60 serves to protect at least the starting motor 30 from damages that may occur due to the starting motor 30 being run more aggressively than its rating would suggest is possible or safe. In accordance with embodiments, the rating of the starting motor 30 may relate to one or more of an allowable starting motor power, an allowable starting motor speed and an allowable starting motor acceleration. In each case, the control loop unit 60 may take as an input from the controller 502 any one or more of the servo control signal 507 (where the rating relates to an allowable starting motor power), the second control signal 607 (where the rating relates to current torque converter output torque), a third control signal 707 (where the rating relates to desired gas turbine acceleration reference data) and/or a fourth control signal 807 (where the rating relates to desired gas turbine speed reference data).

In accordance with an embodiment, the control loop unit 60 then selects the least or minimum of, for example, the servo control signal 507, the second control signal 607 and the third control signal 707 as the main control signal 601. The main control signal 601 is then employed to set the angle of the guide vanes 21 of the torque converter 20. Thus, the starting motor 30 is prevented from miming at a power, torque, speed or acceleration that may require an excess of either of the other two measures.

That is, if the torque converter 20 draws a safe amount of power from the starting motor 30 at a rotational speed within safe parameters but at an acceleration profile that is too aggressive, the control loop unit 60 may select the least or minimum of, for example, the servo control signal 507, the second control signal 607 or the third control signal 707 as the main control signal 601 and may then set the guide vanes 21 at an angle associated with safe acceleration. This, in turn, limits the ability of the torque converter 20 to draw as much power from the starting motor 30 or to allow the starting motor 30 to operate at such rotational speeds.

In accordance with further embodiments, it is to be understood that the control loop unit 60 may be configured to allow the use of any one or more of the servo control signal 507, the second control signal 607, the third control signal 707 and/or the fourth control signal 807. Alternatively, the control loop unit may also be configured to allow the use of three control signals, such as servo control signal 507, the third control signal 707 and the fourth control signal 807 or the second control signal 607, the third control signal 707 and the fourth control signal 807, for example. The configuration chosen will normally depend on system configuration as a whole and on determinations as to which component needs protection and to what degree this protection is required.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A control apparatus for angling guide vanes of a torque converter, the control apparatus comprising:
    a modeling unit configured to receive current condition data, to determine a current input power supplied by a starting motor from the current condition data and to output a result of the determination as a control signal; and
    a controller, which is coupled to the modeling unit and thereby receptive of the control signal,
    the controller being configured to execute a comparison of the current input power with a rating of the starting motor and to angle the guide vanes of the torque converter at an angle in accordance with a result of the comparison, wherein the current condition data comprise at least one of:
    a current rotational speed of an input shaft to which the starting motor and the torque converter are coupled;
    a current guide vane angle of the guide vanes of the torque converter; and
    a current rotational speed of an output shaft to which the torque converter and a compressor of a gas turbine engine are coupled,
    wherein the torque converter and the starting motor form a first pair and an additional starting motor and an additional torque converter form a second pair to apply torque to the output shaft, the control apparatus controlling respective operations of the first and second pairs.

2. The control apparatus according to claim 1, wherein the modeling unit is further configured to determine current output torque and power supplied by the torque converter and to determine an efficiency of the torque converter.

3. The control apparatus according to claim 1, wherein the rating of the starting motor of the first pair relates to an allowable starting motor power.

4. The control apparatus according to claim 1, wherein the rating of the starting motor of the first pair relates to an allowable starting motor speed.

5. The control apparatus according to claim 1, wherein the rating of the starting motor of the first pair relates to an allowable starting motor acceleration.

6. The control apparatus according to claim 1, wherein the controller is further configured to execute a comparison of current torque converter output torque with a torque rating of the torque converter of the first pair and to angle the guide vanes of the torque converter of the first pair at an angle in accordance with a result of the comparison.

7. The control apparatus according to claim 1, wherein, when the additional starting motor of the second pair runs, the starting motor of the second pair is electrically disconnected.

8. The control apparatus according to claim 1, further comprising a control loop unit configured to protect at least the starting motor of the first pair from damages occurring due to the starting motor of the first pair being run beyond a rating thereof.

9. The control apparatus according to claim 8, wherein the rating of the starting motor of the first pair relates to one or more of an allowable starting motor power, an allowable starting motor speed and an allowable starting motor acceleration and the control loop unit:
    takes as an input any one or more of a plurality of control signals, and
    selects a minimum of the plurality of control signals as the control signal.

* * * * *